(12) United States Patent
Zhang

(10) Patent No.: US 11,590,846 B2
(45) Date of Patent: Feb. 28, 2023

(54) STEERING WHEEL INDICATING PADDLE FOR DISPLAYING POWER ROTATING SPEED OF AUTOMOBILE

(71) Applicant: Shenzhen Luohe import and export Co. LTD, Shenzhen (CN)

(72) Inventor: Qingyun Zhang, Jiexi (CN)

( * ) Notice: Subject to any disclaimer, the term of this patent is extended or adjusted under 35 U.S.C. 154(b) by 0 days.

(21) Appl. No.: 17/645,965

(22) Filed: Dec. 24, 2021

(65) Prior Publication Data

US 2022/0118852 A1 Apr. 21, 2022

(30) Foreign Application Priority Data

Dec. 17, 2021 (CN) .......................... 202123179813.6

(51) Int. Cl.
*B60K 35/00* (2006.01)
*H05B 47/19* (2020.01)
(Continued)

(52) U.S. Cl.
CPC ............ *B60K 35/00* (2013.01); *H05B 45/30* (2020.01); *H05B 47/18* (2020.01); *H05B 47/19* (2020.01); *B60K 2370/782* (2019.05)

(58) Field of Classification Search
CPC ......... G06F 3/147; G09F 21/04; H04L 67/75; H04L 69/329; H04L 67/01; H04L 67/131; H04B 10/116; H04B 5/0037; H04B 10/1141; H04B 10/114; H04B 10/502; H04B 10/5057; H04B 10/524; H04B 10/564; H04B 10/572; H04B 10/60; H04B 5/0081; H04B 5/0093; H04B 10/503; H04B 5/0031; H04B 3/54; H04B 1/04; H04B 10/807; H04B 1/3838; H04B 1/3888; H04B 10/506; H04B 17/318; H04B 3/58; H04B 7/0617; H04B 1/16; H04B 1/1607; H04B 1/3822; H04B 1/44; H04B 2203/5441; H04B 3/06; H04B 3/50; H04B 3/52; H04B 5/0075; H04B 10/11; H04B 10/25891; H04B 10/40; H04B 17/29; H04B 17/309; H04B 17/345; H04B 17/3911; H04B 17/40; H04B 2001/3861; H04B 2203/5483;
(Continued)

(56) References Cited

U.S. PATENT DOCUMENTS

2004/0041700 A1 3/2004 Hsieh
2006/0261931 A1* 11/2006 Cheng ................. G06V 40/45
340/5.53
(Continued)

*Primary Examiner* — Monica C King
(74) *Attorney, Agent, or Firm* — Rumit R. Kanakia

(57) ABSTRACT

The present invention discloses a steering wheel indicating paddle for displaying a power rotating speed of an automobile. The paddle comprises an emitting panel connected with an OBD port of the automobile, a receiving panel mounted on an R paddle or an L paddle of the automobile, a first lamp panel mounted on another paddle and a second lamp panel integrated to the receiving panel. The emitting panel comprises an OBD signal access circuit, a first master control chip, a first power supply circuit and a wireless sending module. The receiving panel comprises a second master control chip, a second power supply circuit and a wireless sending module. According to the present invention, the OBD signal access circuit is connected with the OBD port of the automobile, so that it acquires a rotating speed condition of an engine.

8 Claims, 4 Drawing Sheets

(51) Int. Cl.
*H05B 45/30* (2020.01)
*H05B 47/18* (2020.01)

(58) Field of Classification Search
CPC ... H04B 3/00; H04B 3/28; H04B 3/36; H04B 3/542; H04B 3/56; H04B 5/0062; H04B 7/0495; H04B 7/0691; H04B 7/212; B60R 1/00; B60R 2021/23153; B60R 2021/0004; B60R 2021/23107; B60R 2021/23169; B60R 2021/23519; B60R 2021/23523; B60R 21/232; B60R 21/233; B60R 21/235; B60R 21/30; B60R 11/04; B60R 21/214; B60R 21/20; B60R 25/25; B60R 2021/23161; B60R 2021/23557; B60R 2021/2358; B60R 2021/2359; B60R 2300/105; B60R 21/0132; B60R 2300/301; B60R 21/213; B60R 2300/205; B60R 2300/806; B60R 2021/0006; B60R 2021/23192; B60R 2021/23308; B60R 2021/23316; B60R 2021/23504; B60R 2021/23514; B60R 2021/2636; B60R 21/2032; B60R 21/206; B60R 21/239; B60R 21/264; B60R 2300/303; B60R 21/0134; B60R 21/00; B60R 16/0315; B60R 2300/207; B60R 2016/0322; B60R 2021/0104; B60R 2021/01061; B60R 2021/01115; B60R 21/16; B60R 2300/107; B60R 2300/607; B60R 2300/804; B60R 2021/23324; B60R 2021/2612; B60R 21/0136; B60R 21/015; B60R 21/26; B60R 2300/8093; B60R 2001/1253; B60R 21/013; B60R 2300/802; B60R 16/023; B60R 21/01516; B60R 21/01536; B60R 1/088; B60R 21/0152; B60R 1/12; B60R 21/01534; B60R 2300/302; B60R 2300/8026; B60R 2300/8066; B60R 2300/8086; B60R 25/257; B60R 11/02; B60R 2021/01184; B60R 2021/01327; B60R 2300/102; B60R 2300/307; B60R 11/00; B60R 16/0231; B60R 16/037; B60R 2001/1223; B60R 2011/0026; B60R 2011/004; B60R 2011/0043; B60R 2021/01068; B60R 2021/01088; B60R 21/0153; B60R 21/01532; B60R 21/01538; B60R 21/01542; B60R 2300/20; B60R 2300/8033; B60R 25/245; B60R 25/252; B60R 1/06; B60R 1/062; B60R 1/072; B60R 2021/01325; B60R 2300/308; B60R 2300/8006; B60R 2325/306; B60R 25/0225; B60R 25/045; B60R 25/1001; B60R 25/24; B60R 1/006; B60R 1/008; B60R 1/04; B60R 1/074; B60R 1/08; B60R 1/081; B60R 1/1207; B60R 11/0205; B60R 11/0211; B60R 11/0229; B60R 11/0235; B60R 16/0234; B60R 16/0239; B60R 16/027; B60R 16/0373; B60R 16/04; B60R 2001/1215; B60R 2001/1261; B60R 2011/0005; B60R 2011/001; B60R 2011/0028; B60R 2011/0059; B60R 2011/0082; B60R 2011/0092; B60R 2011/0096; B60R 2011/0098; B60R 2021/0027; B60R 2021/01109; B60R 2021/01252; B60R 2021/01302; B60R 2021/01315; B60R 2021/26094; B60R 2021/2765; B60R 2022/208; B60R 2022/288; B60R 2022/4685; B60R 2022/4825; B60R 2025/1013; B60R 21/01544; B60R 21/01546; B60R 21/01548; B60R 21/01552; B60R 21/01554; B60R 21/203; B60R 21/21656; B60R 21/276; B60R 22/20; B60R 22/201; B60R 2300/101; B60R 2300/30; B60R 2300/304; B60R 2300/306; B60R 2300/406; B60R 2300/602; B60R 2300/605; B60R 2300/70; B60R 2300/80; B60R 2300/8046; B60R 25/016; B60R 25/043; B60R 25/10; B60R 25/1003; B60R 25/1004; B60R 25/1018; B60R 25/102; B60R 25/2081; B60R 25/209; B60R 25/255; B60R 1/0607; B60R 1/27; B60R 11/0241; B60R 13/10; B60R 13/105; B60R 16/0232; B60R 19/483; B60R 2001/1246; B60R 2001/1284; B60R 2021/0011; B60R 21/01558; B60R 21/21; B60R 21/33; B60R 2300/10; B60R 2300/103; B60R 2300/402; B60R 2300/408; B60R 2300/60; B60R 25/00; B60R 25/02; B60R 25/042; B60R 7/10; H05B 3/342; H05B 45/60; H05B 45/30; H05B 47/19; H05B 47/00; H05B 2203/036; H05B 3/34; H05B 45/46; H05B 47/12; H05B 47/18; H05B 1/0236; H05B 45/00; H05B 45/10; H05B 45/20

See application file for complete search history.

(56) References Cited

U.S. PATENT DOCUMENTS

| | | | |
|---|---|---|---|
| 2008/0255796 A1 | 10/2008 | Takeuchi | |
| 2010/0192835 A1 | 8/2010 | Nakane | |
| 2020/0035100 A1* | 1/2020 | Noda | G08G 1/0133 |
| 2021/0195083 A1* | 6/2021 | Kanai | H04N 5/225 |
| 2022/0063585 A1* | 3/2022 | Tabata | B60L 58/20 |

* cited by examiner

STEERING WHEEL INDICATING PADDLE FOR DISPLAYING POWER ROTATING SPEED OF AUTOMOBILE

BACKGROUND OF THE INVENTION

1. Technical Field

The present invention relates to the technical field of automobile accessories, in particular to a steering wheel indicating paddle for displaying a power rotating speed of an automobile.

2. Description of Related Art

With the continuous development of science and technology, gear shift of an automobile is not just limited to gear shift by stepping on a clutch. In some vehicles, shift paddles are arranged on steeling wheels to play a role of completing upshifting and downshifting operations without putting both hands of a driver aside the steering wheels. The driver usually needs to push the gear position of the shift paddle to D, S or manual modes. By using the shift paddle, the driver can complete upshifting and downshifting operations without putting both hands aside the steering wheel. Relatively common shift paddle positions are left and right sides of an arc in the steering wheel. When the vehicle is switched from D shift to S shift or sports mode to drive, the user can perform forced gear shifting manually on a transmission with a finger anytime. Such an operation is particular works well when it is needed to accelerate rapidly to overtake. In particular, as far as a professional racing driver is concerned, the shift paddle is an apparatus that must be used to improve the gear shifting efficiency.

At present, the driver, for the sake of himself/herself DIY art layout, will refit the shift paddle in light of own preference. The shift paddle is sleeved with a sleeve body with an artistic sense of beauty, so that the shift paddle has a corresponding artistic model, thereby, it is of better sense of beauty. However, at the present, existing DIY refit shift paddles usually have art layout in appearance, are prone to bringing aesthetic fatigue visually, and cannot be linked relatively with gear shifting work of the automobile. Therefore, as far as the user is concerned, the product is poor in experience effect.

BRIEF SUMMARY OF THE INVENTION

Aiming at deficiencies in the prior art, the objective of the present invention is to provide a steering wheel indicating paddle for displaying data conditions such as a power rotating speed of an automobile, a pressure of an air inlet manifold and a load of an engine. In use, a gear shifting indicating lamp can help a driver judge a gear shifting time better without reviewing a revolution meter, which further improves the safety of the vehicle. The driver can put a line of sight on a road all the time.

In order to achieve the purpose, the present invention adopts a technical scheme as follows:

A steering wheel indicating paddle for displaying a power rotating speed of an automobile, including an emitting panel connected with an OBD port of the automobile, a receiving panel mounted on an R paddle or an L paddle of the automobile, a first lamp panel mounted on another paddle and a second lamp panel integrated to the receiving panel;

wherein the emitting panel includes an OBD signal access circuit, a first master control chip, a first power supply circuit and a wireless sending module, the receiving panel includes a second master control chip, a second power supply circuit and a wireless sending module, and the first lamp panel and the second lamp panel both are provided with lamp panels of marquees and LED driving circuits;

the OBD signal access circuit includes a CAN transceiver, a K wire communication chip of the automobile, is connected with the OBD port of the automobile via the CAN transceiver and the K wire communication chip of the automobile and acquires a real-time data signal of the engine of the automobile, the first master control chip is connected with the CAN transceiver, the K wire communication chip of the automobile and the wireless sending module, and the first power supply circuit is respectively connected with the first master control chip, the wireless sending module and the OBD signal access signal and provides a power supply; and the second master control chip and the first master control chip are in wireless communication connection via a wireless receiving module and the wireless sending module or are in wired connection via the CAN signal access circuit and an original automobile balance spring, the second master control chip is respectively connected with the LED driving circuits via serial buses, the LED driving circuits are connected with the lamp panels of the marquees, and the second power supply circuit respectively supplies power to the wireless receiving module, the second master control chip and the lamp panels of the marquees.

Preferably, the first master control chip is connected with a Bluetooth circuit and a paired button.

Preferably, the first master control chip is connected with a vibration sensing circuit.

Preferably, the first master control chip is connected with a USB interface.

Preferably, the first power supply circuit and the second power supply circuit both are connected to a 12V power supply provided by an automobile battery respectively.

Preferably, the second master control chip of the receiving panel is connected with the LED driving circuit via a GPIO port bus, the LED driving circuit including at least three drivers.

Preferably, it further includes touch buttons mounted on the R paddle and the L paddle and used to adjust a working state manually.

Preferably, the second master control chip is connected with a microphone via an MIC amplifying circuit.

With adoption of the above-mentioned scheme, according to the present invention, the OBD signal access circuit is connected with the OBD port of the automobile, so that it acquires a rotating speed condition of an engine. An effect of displaying a power rotating speed of the automobile on the paddle can be realized by means of wireless or wired communication and control of the lamp panel of a marquee on the paddle to work correspondingly, thereby giving a user more intuitive observation. The integral dynamic sense of beauty is also enhanced, thereby giving the user better product experience.

DETAILED DESCRIPTION OF THE INVENTION

Detailed description is made on the embodiments of the present invention below in combination with drawings. However, the present invention can be implemented by various different modes defined and covered by Claims.

Figure 1:
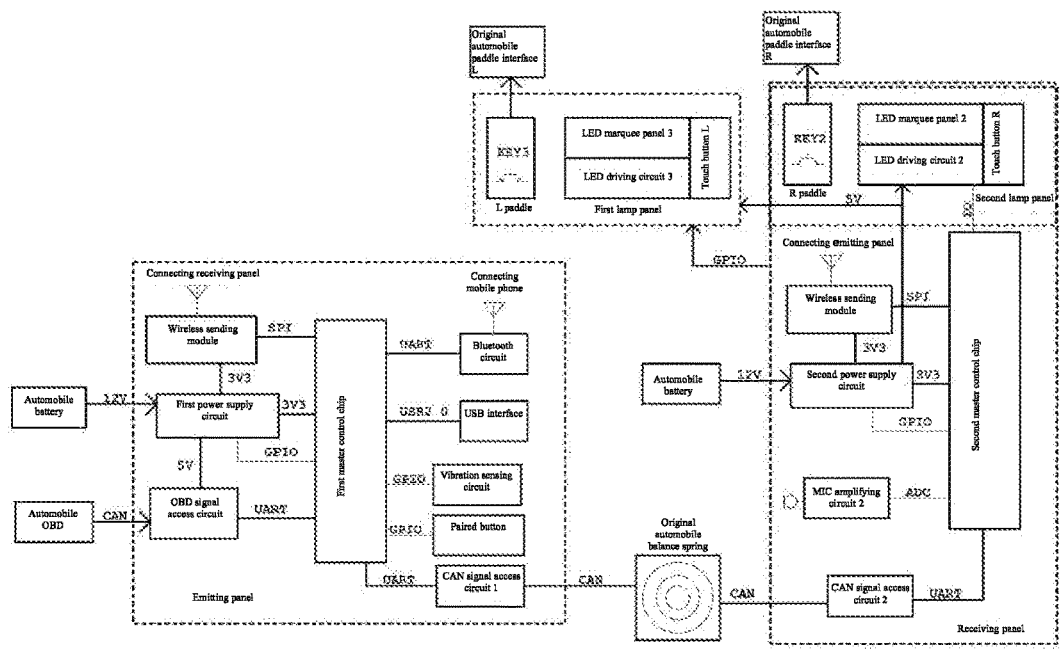
FIG. 1 is a schematic diagram of a structure principle of an embodiment of the present invention.
Figure 2:
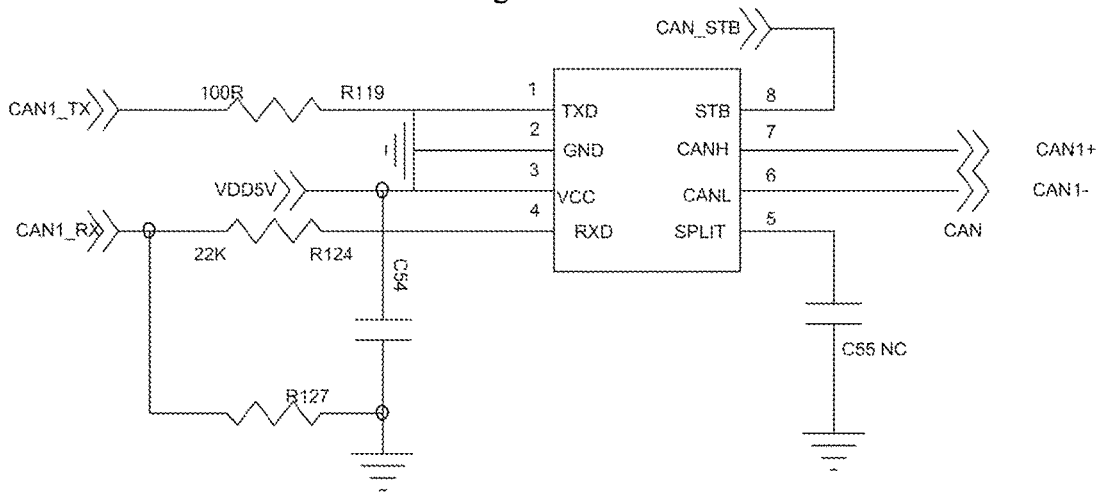
FIG. 2 is a schematic diagram of a circuit structure of a CAN transceiver of an embodiment of the present invention.
Figure 3:
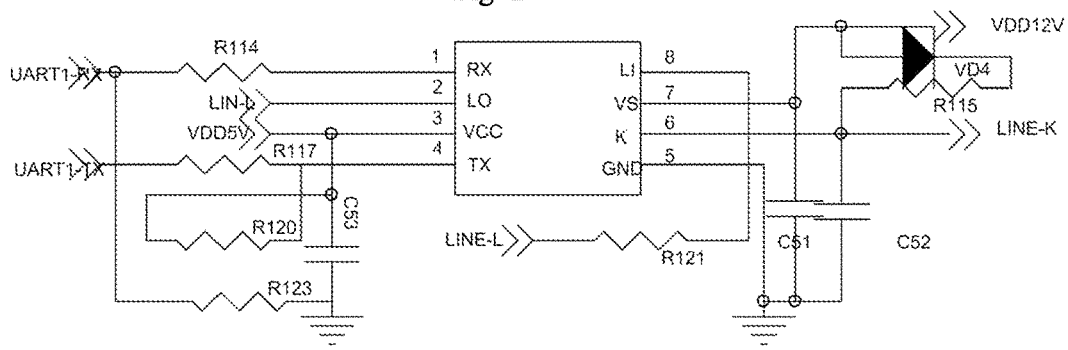
FIG. 3 is a schematic diagram of a circuit structure of a K wire communication chip of an automobile of an embodiment of the present invention.
Figure 4:
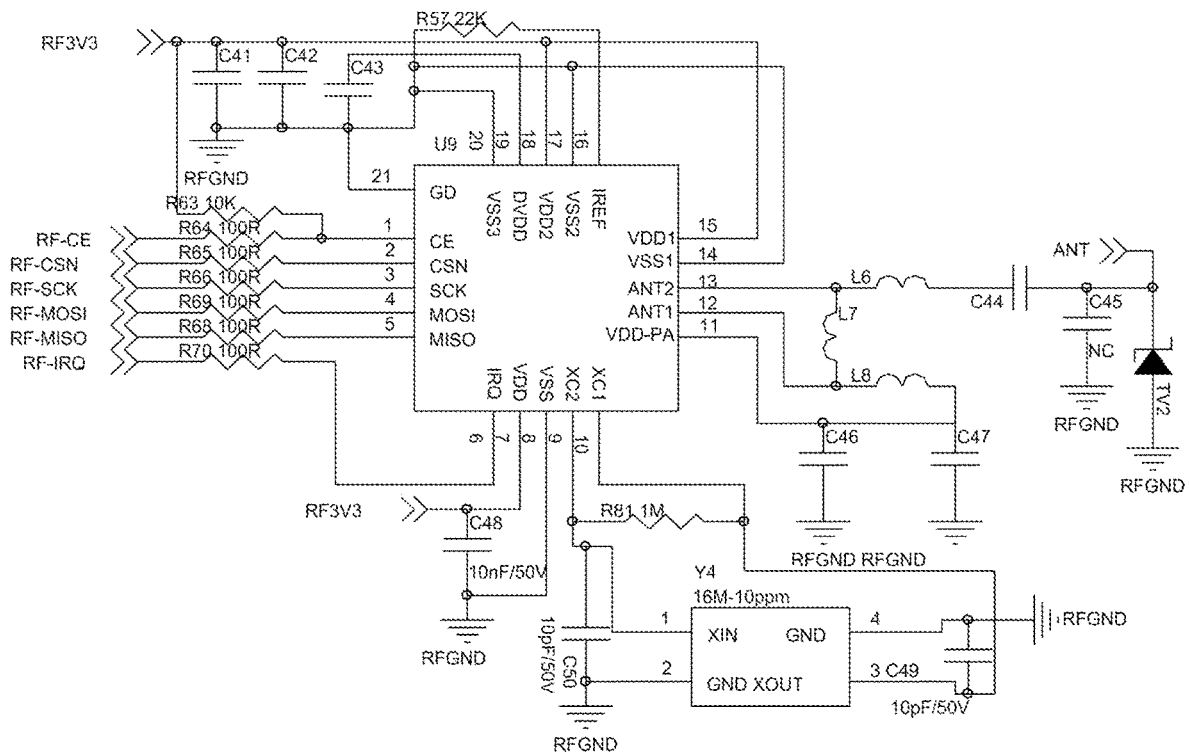
FIG. 4 is a schematic diagram of a circuit structure of a wireless sending module of an embodiment of the present invention.

As shown in FIG. 1 to FIG. 7, a steering wheel indicating paddle for displaying a power rotating speed of an automobile includes an emitting panel connected with an OBD port of the automobile, a receiving panel mounted on an R paddle 100 or an L paddle 101 of the automobile, a first lamp panel mounted on another paddle and a second lamp panel integrated to the receiving panel;

wherein the emitting panel includes an OBD signal access circuit, a first master control chip, a first power supply circuit and a wireless sending module, the receiving panel includes a second master control chip, a second power supply circuit and a wireless sending module, and the first lamp panel and the second lamp panel both are provided with lamp panels of marquees and LED driving circuits; both the first master control chip and the second master control chip are STM32F105RBT6 chips, and both the wireless sending module and the wireless receiving module are SI24R1L communication chips; and the OBD signal access circuit is shown in FIG. 2 and FIG. 3, includes the CAN transceiver and the K wire communication chip of the automobile, is connected with the OBD port of the automobile via the CAN transceiver and the K wire communication chip of the automobile and acquires data conditions such as the power rotating speed of the automobile, the pressure of the air inlet manifold and the load of the engine. The first master control chip is connected with the CAN transceiver, the K wire communication chip of the automobile and the wireless sending module, so that the data conditions such as the power rotating speed of the automobile, the pressure of the air inlet manifold and the load of the engine are sent to the first master control chip to be collated. The collated information is sent to the receiving panel. The power supply for work of the module is provided via the first power supply, so that the first power supply is respectively connected with the first master control chip, the wireless sending module and the OBD signal access signal and provides a power supply. Both the first power supply circuit and the second power supply circuit use an AN-SY8201 converter and a JW5033S converter respectively. Both the first power supply circuit and the second power supply circuit are originated from the 12V power supply provided by the automobile battery.

The second master control chip and the first master control chip are in wireless communication connection via a wireless receiving module and the wireless sending module or are in wired connection via the CAN signal access circuit and an original automobile balance spring. Therefore, data condition signals such as the power rotating speed of the automobile, the pressure of the air inlet manifold and the load of the engine will be sent to the second master control chip of the receiving panel. The second master control chip receiving the signals collate and feed back the signals and then are respectively connected with the LED driving circuits via the serial buses. The LED driving circuits are connected with the lamp panels 102 of the marquees, and the second power supply circuit respectively supplies power to the wireless receiving module, the second master control chip and the lamp panels of the marquees, so that signals sent by an emitting panel arrive finally to control work of the lamp panels 102 of the marquees. For indicating work of the lamp panels 102 of the marquees, i.e., indication of power state of playing gear, various indicating states can be used, for example, the number of beads turned on, the color of beads turned on and brightness and darkness with progressive increase beads or skip flickering. In order to switch functions by the user, the touch buttons 103 for adjusting the working state manually are mounted on the R paddle 100 and the L paddle 101 of the automobile. Touch information of the touch button 103 is fed back to the second master control chip. The second master control chip changes the display states of the marquees according to corresponding control information.

Figure 6:
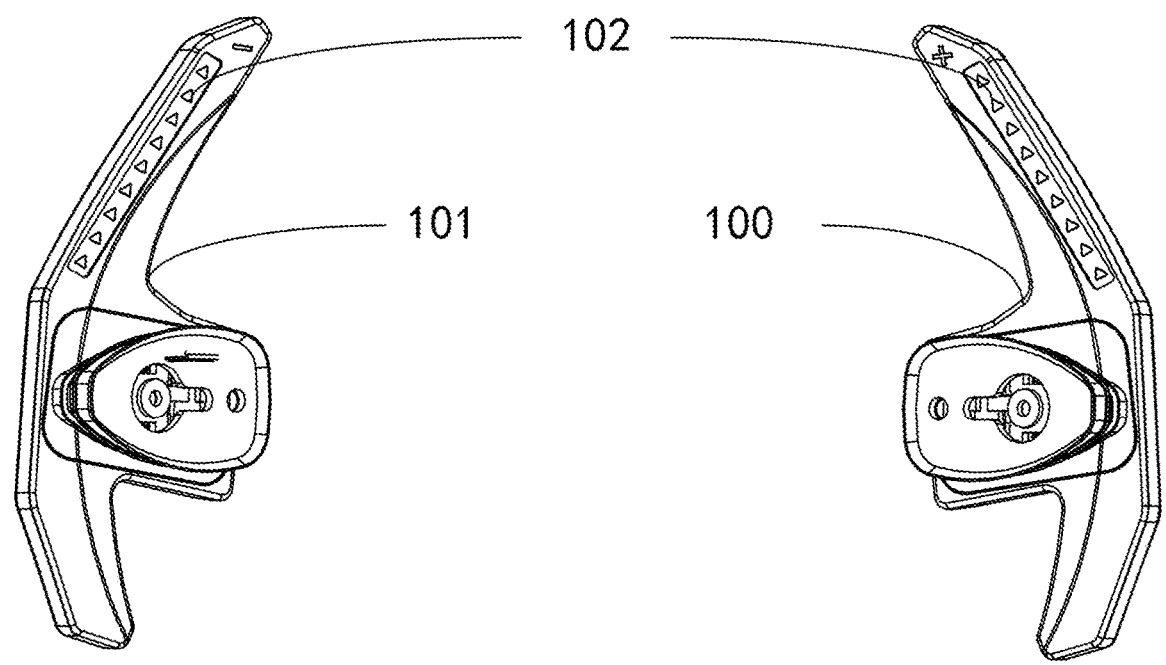
FIG. 6 is a schematic diagram of structures of specific material objects of an L paddle and an R paddle of an embodiment of the present invention.
Figure 7:
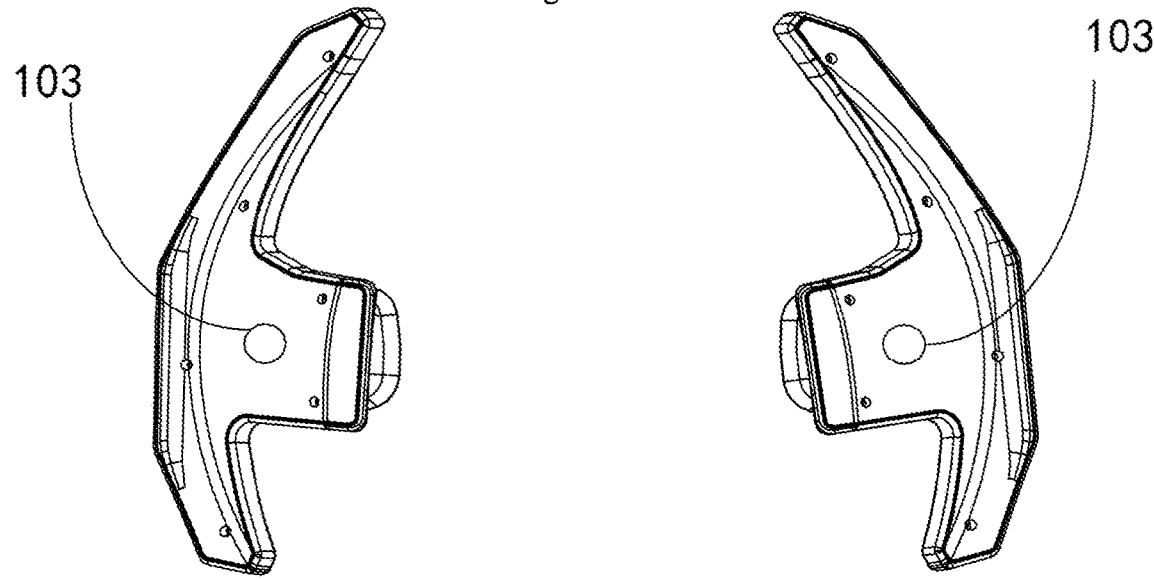
FIG. 7 is a schematic diagram of front structures of specific material objects of an L paddle and an R paddle of an embodiment of the present invention.
Figure 8:
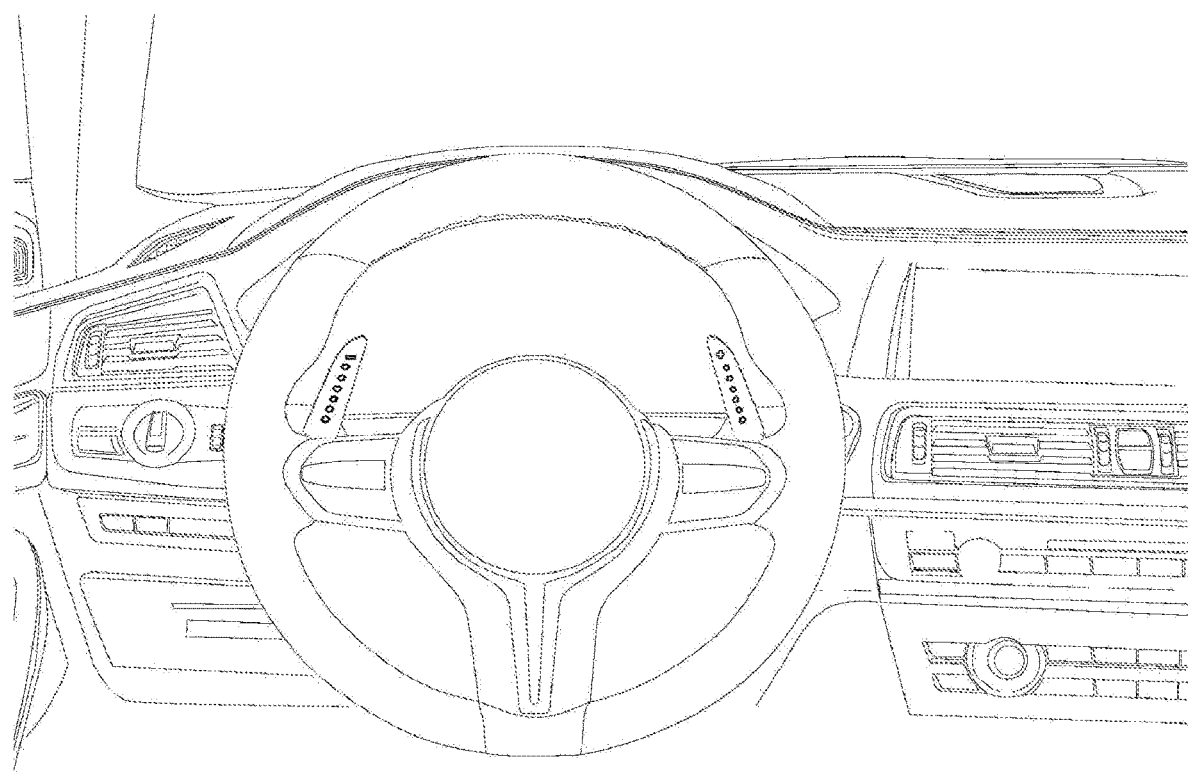
FIG. 8 is a schematic diagram of a using state of an embodiment of the present invention applied to a steering wheel.

In addition, for mounting of the emitting panel, the emitting panel is directly connected with the OBD port of the automobile when being plugged, and then is detachably mounted on the automobile in an adhering manner. The receiving panel can be selectively integrated to the paddle or the steering wheel or can be detachably adhered to the steering wheel, and is preferably integrated to the paddle, as shown in FIG. 6. Or, it is directly integrally mounted on the paddle when being delivered.

Figure 5:
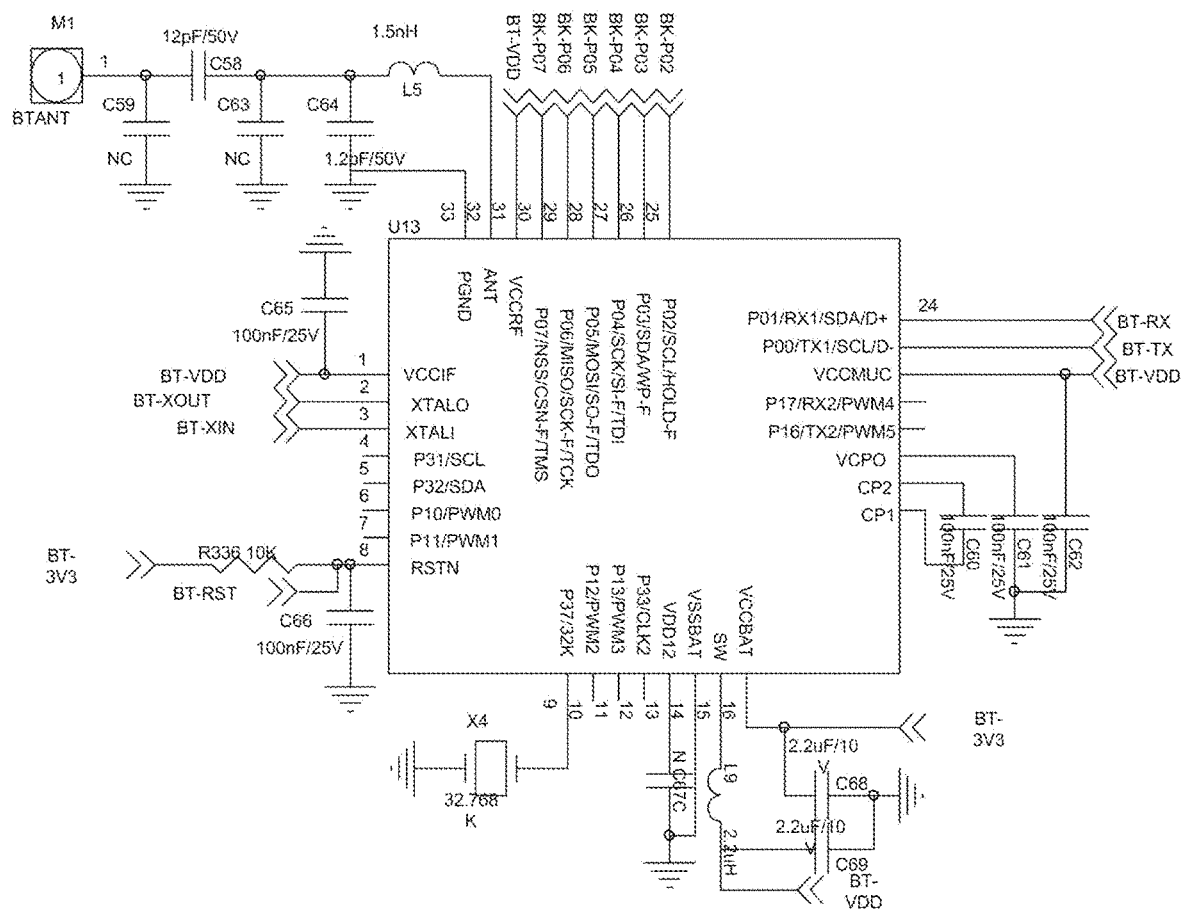
FIG. 5 is a schematic diagram of a circuit structure of a Bluetooth circuit of an embodiment of the present invention.

Further, in order to connect it with a mobile phone of the user conveniently so as to achieve a connection with an APP of the mobile phone, the first master control chip of the embodiment is connected with the Bluetooth circuit and the paired button. A circuit diagram of its Bluetooth circuit is as shown in FIG. 5.

Further, the first master control chip is connected with a vibration sensing circuit to sensing a vibration condition, and vibration is represented by an indicating lamp. The representing effect and the gear position representing effect are different.

Further, the first master control chip is connected with a USB interface.

Preferably, the second master control chip of the receiving panel is connected with the LED driving circuit via a GPIO port bus, the LED driving circuit including at least three drivers to work relatively. The drivers are WS2812B drivers.

Further, the second master control chip is connected with a microphone via an MIC amplifying circuit. The microphone detects outside sounds, thereby playing another role of controlling light.

The above is merely preferred embodiments of the application and does not hence limit the patent range of the application. Equivalent structure or equivalent flow conversion made by means of the contents of the description and drawings of the application are applied to other related technical fields directly or indirectly, which is, in a similar way, comprised in the protection scope of the patent of the application.

What is claimed is:

1. A steering wheel indicating paddle for displaying a power rotating speed of an automobile, characterized by comprising an emitting panel connected with an OBD port of the automobile, a receiving panel mounted on an R paddle or an L paddle of the automobile, a first lamp panel mounted on another paddle and a second lamp panel integrated to the receiving panel;

wherein the emitting panel comprises an OBD signal access circuit, a first master control chip, a first power supply circuit and a wireless sending module, the receiving panel comprises a second master control chip, a second power supply circuit and a wireless sending module, and the first lamp panel and the second lamp panel both are provided with lamp panels of marquees and LED driving circuits;

the OBD signal access circuit comprises a CAN transceiver, a K wire communication chip of the automobile, is connected with the OBD port of the automobile via the CAN transceiver and the K wire communication chip of the automobile and acquires a real-time data signal of the engine of the automobile, the first master control chip is connected with the CAN transceiver, the K wire communication chip of the automobile and the wireless sending module, and the first power supply circuit is respectively connected with the first master control chip, the wireless sending module and the OBD signal access signal and provides a power supply; and the second master control chip and the first master control chip are in wireless communication connection via a wireless receiving module and the wireless sending module or are in wired connection via the CAN signal access circuit and an original automobile balance spring, the second master control chip is respectively connected with the LED driving circuits via serial buses, the LED driving circuits are connected with the lamp panels of the marquees, and the second power supply circuit respectively supplies power to the wireless receiving module, the second master control chip and the lamp panels of the marquees.

2. The steering wheel indicating paddle for displaying a power rotating speed of an automobile as claimed in claim 1, characterized in that the first master control chip is connected with a Bluetooth circuit and a paired button.

3. The steering wheel indicating paddle for displaying a power rotating speed of an automobile as claimed in claim 1, characterized in that the first master control chip is connected with a vibration sensing circuit.

4. The steering wheel indicating paddle for displaying a power rotating speed of an automobile as claimed in claim 1, characterized in that the first master control chip is connected with a USB interface.

5. The steering wheel indicating paddle for displaying a power rotating speed of an automobile as claimed in claim 1, characterized in that the first power supply circuit and the second power supply circuit both are connected to a 12V power supply provided by an automobile battery respectively.

6. The steering wheel indicating paddle for displaying a power rotating speed of an automobile as claimed in claim 1, characterized in that the second master control chip of the receiving panel is connected with the LED driving circuit via a GPIO port bus, the LED driving circuit comprising at least three drivers.

7. The steering wheel indicating paddle for displaying a power rotating speed of an automobile as claimed in claim 1, characterized by further comprising touch buttons mounted on the R paddle and the L paddle and used to adjust a working state manually.

8. The steering wheel indicating paddle for displaying a power rotating speed of an automobile as claimed in claim 1, characterized in that the second master control chip is connected with a microphone via an MIC amplifying circuit.

* * * * *